Feb. 27, 1962  A. CRESSWELL ETAL  3,023,134
MOLDED ARTICLES AND METHOD OF MAKING THE SAME
Filed July 15, 1955
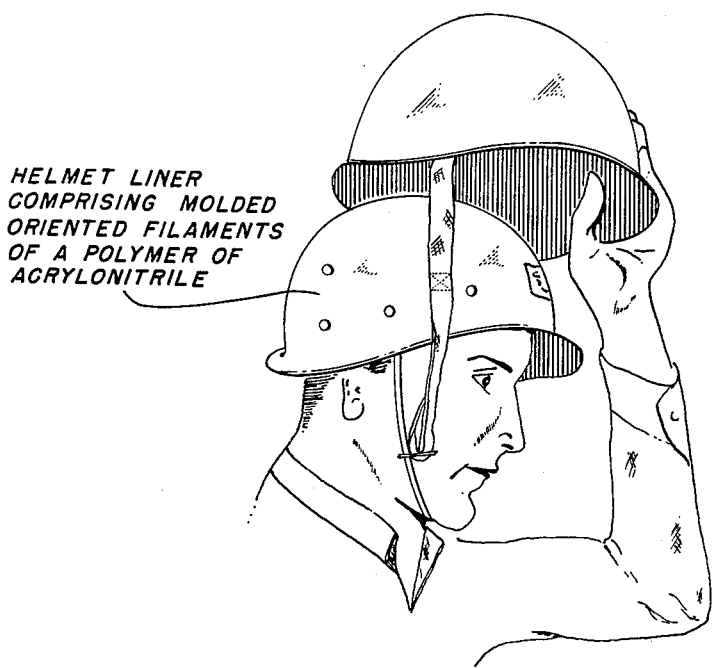
HELMET LINER COMPRISING MOLDED ORIENTED FILAMENTS OF A POLYMER OF ACRYLONITRILE
INVENTORS.
ARTHUR CRESSWELL,
WITOLD R. KOCAY,
IVOR H. UPDEGRAFF.
BY Harold L. Kauffman
ATTORNEY.

United States Patent Office 3,023,134
Patented Feb. 27, 1962

3,023,134
MOLDED ARTICLES AND METHOD OF MAKING THE SAME
Arthur Cresswell, Witold R. Kocay, and Ivor H. Updegraff, Stamford, Conn., assignors to American Cyanamid Company, New York, N.Y., a corporation of Maine
Filed July 15, 1955, Ser. No. 522,320
18 Claims. (Cl. 154—43)

This invention relates broadly to certain new and useful improvements in molded articles and in a method of making the same. More particularly, the invention is concerned with products comprising a molded article having high impact and flexural strengths and comprising molecularly oriented filaments of an acrylonitrile polymer containing an average of at least 80% by weight of combined acrylonitrile. In the molded articles of the invention the aforementioned filaments are heat-bonded together during molding without complete fusion of all of the individual filaments.

Molded articles made from various types of thermoplastic and thermosetting, or potentially thermosetting, resins were well-known prior to the present invention. Typical examples of resinous materials from which molded articles heretofore have been made include melamine-, urea- and phenol-formaldehyde resins, polystyrene, polyvinyl chloride, polymerized methyl methacrylate, polyethylene, etc. Such prior molded articles have extensive applications both in industry and for various decorative purposes, but are not entirely satisfactory for many applications where high flexural and impact strengths are required, e.g., protective wearing apparel of various kinds such as headgear (e.g., industrial, fireman's, policeman's, military, etc., helments and helmet liners), shin guards for hockey players, chest and back protectors for umpires, baseball catchers, military personnel, etc., protective toes of shoes of industrial workers, etc., and which serve to protect the wearer from injury in the event of sharp blows. Our invention not only provides improved apparel of the kind just named, but also molded shapes adapted for many uses other than as wearing apparel, especially those requiring a high impact strength, for instance as a core on which an electrical conductor is wound to form a coil, as terminal blocks of electrical apparatus, and for various other electrically insulating purposes and as components of electrical devices.

Oriented synthetic fibers made from a polymer of acrylonitrile (homopolymeric acrylonitrile and copolymers of acrylonitrile) have a number of desirable properties including high strength and good resistance to attack by moisture, chemicals, mildew, etc. It is well-known that these fibers may be spun into yarn, woven into cloth and fashioned into textile articles which retain the advantageous properties of the polyacrylonitrile fiber. However, to the best of our knowledge and belief, it was not known prior to our invention that molded articles having a surprisingly high impact strength, as well as a high flexural strength and other desirable properties, could be produced from oriented filaments of a polymer of acrylonitrile as briefly described in the first paragraph of this specification and more fully hereinafter. The molded articles of the present invention are characterized by having a surprisingly high impact strength which, in general, is of the order of at least 2 ft. pounds per inch of notch (Izod method). Additionally, their flexural strength is very high and usually is at least 10,000 pounds per square inch. These properties, combined with the other known useful properties of fibers of polyacrylonitrile such as good resistance to water, excellent electrical characteristics, resistance to acids and other solvents, etc., make the molded articles of our invention eminently suitable for use in such applications as those mentioned above.

The oriented polyacrylonitrile fibers or filaments employed in carrying the present invention into effect are produced by known methods. For instance, they may be made by methods such as are described in Cresswell U.S. Patent No. 2,676,161, dated April 20, 1954, and in the patents mentioned therein; or by the procedures more specifically described in Cresswell U.S. Patent No. 2,558,730 and Cresswell et al. U.S. Patent No. 2,558,733, each dated July 3, 1951, and in the patents (identified in some cases by application serial numbers) referred to therein. Stretched (oriented) gelled fibers of an acrylonitrile polymer, for instance, stretched aquagel (hydragel) polyacrylonitrile fibers produced as described in the aforementioned Cresswell patents, can be shrunken into hard masses having a high impact strength, e.g., by digestion in superheated steam or hot water, under pressure, at a temperature of, for instance, from 320° F. to 450° F. These masses then can be cut, sawed, carved, molded or otherwise shaped or fabricated into useful articles having a high impact strength and other desirable properties.

The oriented filaments used in practicing the present invention are made from polymeric (homopolymeric) acrylonitrile and acrylonitrile copolymers (thermoplastic acrylonitrile copolymers) containing in the polymer molecules an average of at least 80% by weight of combined acrylonitrile. These polymers and copolymers are prepared by methods now well-known to those skilled in the art. In some cases the polymerization rates of the individual monomers in a polymerizable mixture may be different, with the result that the proportions of the components in the final copolymer are different from the proportions thereof in the mixture of monomers which is polymerized. The proportions of monomers in the polymerizable mixture therefore preferably are adjusted so that the final copolymer contains in the molecules thereof an average of at least 80% by weight of combined acrylonitrile. The expression "polymer containing an average of at least 80% by weight of combined acrylonitrile," as used herein and in the appended claims, means a polymerization product (polymer, copolymer, interpolymer or graft copolymer, or mixture thereof) containing in its molecules an average of at least 80% by weight of the acrylonitrile unit, which is considered to be present in the individual polymer molecule as the group

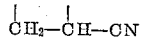

or, otherwise stated, at least 80% by weight of the reactant substance converted into and forming the polymerization product is acrylonitrile.

Illustrative examples of monomers which may be copolymerized with acrylonitrile to yield a polymerization product (copolymer or interpolymer) containing in the polymer molecules an average of at least 80% by weight of combined acrylonitrile are compounds containing a single $CH_2=C<$ grouping, for instance, the vinyl esters and especially the vinyl esters of saturated aliphatic monocarboxylic acids, e.g., vinyl acetate, vinyl propionate, vinyl butyrate, etc.; vinyl and vinylidene halides, e.g., the vinyl and vinylidene chlorides, bromides and fluorides; allyl-type alcohols, e.g., allyl alcohol, methallyl alcohol, ethallyl alcohol, etc.; allyl, methallyl and other unsaturated monohydric alcohol esters of monobasic acids, e.g., allyl and methallyl acetates, laurates, cyanides, etc.; acrylic and alkacrylic acids (e.g., methacrylic, ethacrylic, etc.) and esters and amides of such acids (e.g., methyl, ethyl, propyl, butyl, etc., acrylates and methacrylates, acrylamide, methacrylamide, N-methyl, -ethyl, -propyl, -butyl, etc., acrylamides and methacrylamides, etc.); methacrylonitrile, ethacrylonitrile and other hydrocarbonsubstituted acrylonitriles; unsaturated aliphatic hydrocarbons containing a single $CH_2=C<$ grouping, e.g., isobutylene, etc.; the various vinylpyridines, including the unsubstituted vinylpyridines (eg., 2-, 3- and 4-vinylpyridines), the lower-alkyl-substituted vinylpyridines (e.g., 2-methyl-5-vinylpyridine, 2-ethyl-5-vinylpyridine, 2-vinyl-5-ethylpyridine, etc.) and numerous other vinyl, acrylic and other compounds containing a single $$CH_2=C<$$

grouping which are copolymerizable with acrylonitrile to yield thermoplastic copolymers. Alkyl esters of alpha, beta-unsaturated polycarboxylic acids also may be copolymerized with acrylonitrile to form copolymers which are useful in making oriented filaments that can be employed in practicing the present invention, e.g., the dimethyl, -ethyl, -propyl, -butyl, etc., esters of maleic, fumaric, citraconic, etc., acids.

The acrylonitrile copolymers used in making the oriented filaments for our purpose are not limited to two-component copolymers. Thus, they may be polymers of three or more monomers, e.g., copolymers of, by weight, from 80 to 92% of acrylonitrile, from 2 to 20% of a vinylpyridine or other vinyl-substituted tertiary heterocyclic amine, and up to 10% of at least one other monoethylenic monomer copolymerizable therewith, e.g., styrene, methyl acrylate, vinyl acetate, acrylamide, methacrylamide, acrylic acid, methacrylic acid, methacrylonitrile, vinyl chloride, allyl alcohol, etc.

Good results are obtained from oriented filaments of homopolymeric acrylonitrile; and from copolymers of acrylonitrile containing, by weight, not less than about 85% of combined acrylonitrile and up to about 15% of at least one different monoethylenically unsaturated compound which is copolymerizable with acrylonitrile (numerous examples of which have been given hereinbefore) and which is combined in the copolymer.

The polymeric and copolymeric acrylonitriles used in making our oriented filamentary starting materials may be of any suitable molecular weight, but ordinarily the molecular weight (average molecular weight) is within the range of 40,000 to 200,000 or higher, and advantageously is of the order of 50,000 to 100,000, e.g., about 70,000–75,000, as calculated from a viscosity measurement of the polymer in dimethyl formamide using the Staudinger equation (reference: Houtz U.S. Patent No. 2,404,713, dated July 23, 1946).

The oriented polyacrylonitrile filaments are preferably in the form of flock or staple (that is, cut tow varying in length from, for instance, ½" to 3 or 4" or more) prior to molding, and they may be dyed or undyed, pigmented or non-pigmented. Waste oriented filamentary material that is unsuitable for textile fabrication can be used. If desired, the short lengths of filaments (staple or flock) may be mixed, prior to molding, with fillers of various kinds, for example, asbestos, titanium dioxide, powdered, unoriented acrylonitrile polymer, metal powders, wood flour, mica, etc.

In practicing the present invention molding, more particularly compression molding, of the oriented filaments comprised of an acrylonitrile polymer is effected at a temperature and for a period of time sufficient to heat-bond the individual filaments together during molding, but the temperature and time of molding are in no case such as would cause complete fusion of all of the individual filaments, since this would result in lower values for such properties as impact and flexural strengths. In general, the temperature of molding is not less than about 300° F., preferably not less than about 330° F. (especially when the oriented filaments are made from a homopolymer of acrylonitrile) and, as has been indicated above, it is below the temperature at which complete fusion of all of the individual filaments takes place.

In order that those skilled in the art may better understand how the present invention may be carried into effect, the following examples are given by way of illustration and not by way of limitation. All parts and percentages are by weight.

TABLE

| Properties | Example 1<br>3 denier tow (oriented filaments) made from a copolymer of about 95% acrylonitrile and 5% methyl acrylate | Example 2<br>Powdered copolymer used in making the tow of Example 1 | Example 3<br>3 denier, 2-inch staple made from an acrylonitrile polymer comprised of a ternary polymer of about 94% acrylonitrile, about 5% 2-methyl-5-vinylpyridine and about 1% vinyl acetate | Example 4<br>3 denier, 2-inch staple made from homopolymeric acrylonitrile |
|---|---|---|---|---|
| Flexural strength, p.s.i. | 16,300 | 1,700 | 14,500 | 12,300 |
| Deflection, mils | 430 | 45 | 250 | 250 |
| Impact strength, Izod, ft. lbs./in. of notch | 2.53 | 0.21 | 7.41 | 17.1 |
| Impact strength, Ski Ball,[1] ft. lbs./in. of notch | | 0.05 | | |
| Shrinkage, mold, mils/inch | 0.5 | 0.1 | 0.6 | 0.3 |
| Shrinkage, after 48 hrs. at 104° C | | 7.0 | 0.9 | 3.3 |
| Heat distortion temp., ° C | 84 | 85 | 87 | 91 |
| Arc resistance, seconds, avg.: | | | | |
| Dry conditions | 132 | 145 | | |
| Humid conditions | 134 | 131 | | |
| Dielectric strength at 100° C., volts per mil | 280 | 310 | | |
| Water absorption, percent | 0.08 | 0.06 | 0.13 | |

[1] A Ball Impact Tester for Plastics, Charles R. Stock, ASTM Bulletin, October 1944, No. 130, page 21.

The foregoing table shows the properties of molded articles made from oriented filaments produced from various polymers of acrylonitrile (Examples 1, 3 and 4). Example 2 (column 2 in the foregoing table) shows the results of similarly molding a powdered copolymer of the kind used in making the oriented filaments (3 denier tow) used in Example 1 (column 1).

All of the specimens were compression molded at 340° F. and, in all cases, the pressure was maintained while the mold was cooled from the molding temperature to approximately 40° C. before removing the specimen. Discs were molded at 8600 pounds per square inch and bars at 7500 pounds per square inch. Articles were also made in the form of cereal bowls which were molded at approximately 6000 pounds per square inch. The molds were lubricated with zinc stearate in all cases. From the data shown in the above table it will be noted that the molded articles made from the oriented filaments (Examples 1, 3 and 4) in all cases were outstanding in such properties as flexural strength, which varied from 12,300 to 16,300 pounds per square inch; as well as in impact strength, which, by the Izod test method, varied from 2.53 to 17.1 ft. pounds per inch of notch. The other properties also were in general quite satisfactory and were superior in certain respects, e.g., deflection. The arc resistance and dielectric strength values, as well as the percent of water absorbed, were also very good. The outstanding flexural strength, deflection and especially the high impact strength were wholly surprising and unexpected properties, and in no way could have been predicted from the known properties of the acrylonitrile polymer or from the properties of oriented filaments made from other synthetic materials.

*Example 5*

This example illustrates the production of a molded article using lubricated molecularly oriented filaments of an acrylonitrile polymer containing an average of at least 80% by weight of combined acrylonitrile, more particularly a ternary polymer of, by weight, about 5.0% vinyl acetate, about 6.3% 2-methyl-5-vinylpyridine and the remainder acrylonitrile. The foregoing polymer was wet-spun to form a tow, oriented by stretching, and the dried tow lubricated by treating it with about 2.3%, by weight thereof, of a non-ionic antistatic finish composed principally of low-viscosity mineral oil. The lubricated, dry tow was hot-stretched about 80% to effect further molecular orientation, and was then cut into discontinuous staple lengths. A portion of the lubricated staple fiber was further cut into lengths averaging about ½ inch prior to molding as described below.

A bar was molded from the above lubricated staple at about 340° F. and under a pressure of about 7500 pounds per square inch. The filaments (in the form of staple fiber) were heat-bonded together during molding without complete fusion of all of the individual filaments. The bar had an impact strength greater than 4 ft. lbs. per inch of notch (Izod method), perhaps as much as 5 to 10 ft. lbs. per inch of notch as the exact value was not determined. Other properties of molded pieces made from the above-described lubricated staple are of the same general order as those of the products of Examples 1, 3 and 4.

The oriented filaments may be lubricated with any suitable lubricant that will aid in molding them to a desired shape, other examples including mineral oil containing an oil-dispersible anionic emulsifier, e.g., triethanolamine oleate; mineral oil containing an oil-dispersible cationic emulsifier, e.g., octadecyltrimethylammonium stearate; various vegetable oils (e.g., olive oil, teaseed oil, etc.) and mixtures thereof with low-viscosity mineral oils; glyceryl triesters, e.g., glyceryl trioleate, etc.; and others that will be apparent to those skilled in the art from the foregoing illustrative examples.

From the foregoing description it will be seen that the present invention provides a product comprising a hard, rigid, heat- and compression-molded article having a flexural strength of at least 10,000 pounds per square inch and/or an Izod impact strength of at least 2 ft. lbs. per inch of notch and comprising a cementation of fused synthetic material and fusible synthetic filaments which are fusible under heat and pressure to yield said fused synthetic material, all of the said fusible synthetic filaments having approximately the same fusion point and being molecularly oriented, discontinuous filaments of an acrylonitrile polymer containing an average of at least 80% by weight of combined acrylonitrile, and the said fused synthetic material having the same chemical constitution as the said fusible synthetic filaments. It also provides methods of preparing such articles.

The single FIGURE of the accompanying drawing is illustrative of a molded article of the present invention, more particularly headgear and specifically a helmet liner. The moldings may be in the form of helmets, coil supports, terminal blocks or other articles of manufacture.

We claim:

1. A product comprising a hard, rigid, heat- and compression-molded article having a flexural strength of at least 10,000 pounds per square inch and comprising a cementation of fused synthetic material and fusible synthetic filaments which are fusible under heat and pressure to yield said fused synthetic material, all of the said fusible synthetic filaments having approximately the same fusion point and being molecularly oriented, discontinuous filaments of an acrylonitrile polymer containing an average of at least 80% by weight of combined acrylonitrile, and the said fused synthetic material having the same chemical constitution as the said fusible synthetic filaments.

2. A product as in claim 1 wherein the hard, rigid, heat- and compression-molded article is wearing apparel.

3. A product as in claim 2 wherein the wearing apparel is headgear.

4. A product as in claim 3 wherein the headgear is a helmet.

5. A product as in claim 3 wherein the headgear comprises a helmet liner.

6. A product as in claim 1 wherein the molecularly oriented, discontinuous filaments of acrylonitrile polymer are molecularly oriented, discontinuous filaments of homopolymeric acrylonitrile.

7. A product as in claim 1 wherein the molecularly oriented, discontinuous filaments of acrylonitrile polymer are molecularly oriented, discontinuous filaments of a copolymer containing, by weight, not less than about 85% of combined acrylonitrile and up to about 15% of combined methyl acrylate.

8. A product as in claim 1 wherein the molecularly oriented, discontinuous filaments are in the form of staple fibers ranging in length from ½ inch to 4 inches.

9. A product as in claim 1 wherein the molecularly oriented, discontinuous filaments are lubricated, molecularly oriented, discontinuous filaments of the specified acrylonitrile polymer.

10. The method of preparing an article having an Izod impact strength of at least 2 ft. lbs. per inch of notch which comprises placing into the matrix of a mold, which is adapted for compression-molding a thermoplastic material therein under heat, ingredients comprising essentially fusible synthetic filaments, all of which have approximately the same fusion point and are molecularly oriented, discontinuous filaments of an acrylonitrile polymer containing an average of at least 80% by weight of combined acrylonitrile; and subjecting said discontinuous filaments in said mold to conjoint heat and pressure that are sufficient to bond the said filaments together, said heat being a temperature not less than about 300° F. but below the temperature at which complete fusion of all of the individual filaments takes place.

11. A method as in claim 10 wherein the molecularly oriented, discontinuous filaments of acrylonitrile polymer are molecularly oriented, discontinuous filaments of homopolymeric acrylonitrile, and the heat to which said filaments are subjected during molding, so that they are bonded rigidly together, being a temperature not less than about 330° F. but below the temperature at which complete fusion of all of the individual filaments takes place.

12. A method as in claim 10 wherein the molecularly oriented, discontinuous filaments of acrylonitrile polymer are molecularly oriented, discontinuous filaments of a ternary polymer of acrylonitrile, vinyl acetate and a vinylpyridine, said ternary polymer containing not less than about 85% by weight of combined acrylonitrile, and the heat to which said discontinuous filaments are subjected during molding, so that they are bonded rigidly together, being a temperature not less than about 330° F. but below the temperature at which complete fusion of all of the individual filaments takes place.

13. A method as in claim 10 wherein the molecularly oriented, discontinuous filaments of acrylonitrile polymer are molecularly oriented, discontinuous filaments of a copolymer of, by weight, from 80% to 92% of acrylonitrile, from 2% to 20% of a vinylpyridine and up to 10% of at least one other monoethylenic monomer which is copolymerizable with the said acrylonitrile and vinylpyridine; and the heat to which said filaments are subjected during molding, so that they are bonded rigidly together, being a temperature not less than about 330° F. but below the temperature at which complete fusion of all of the individual filaments takes place.

14. The method of preparing an article having an Izod impact strength of at least 2 ft. lbs. per inch of notch which comprises placing into the matrix of a mold, which is adapted for compression-molding a thermoplastic material therein under heat, ingredients comprising essentially fusible synthetic filaments, all of which have approximately the same fusion point and are molecularly oriented, discontinuous filaments of an acrylonitrile polymer containing an average of at least 80% by weight of combined acrylonitrile; subjecting said discontinuous filaments in said mold to conjoint heat and pressure that are sufficient to bond the said filaments together, said heat being a temperature not less than about 300° F. but below the temperature at which complete fusion of all of the individual filaments takes place; and maintaining the pressure while cooling the molded article before removing it from the mold.

15. A method as in claim 14 wherein the temperature during molding is about 340° F., and the pressure during molding and which is maintained while cooling the molded article before removing it from the mold is from about 6000 pounds per square inch to about 8600 pounds per square inch.

16. A product comprising a hard, rigid, heat- and compression-molded article having a flexural strength of at least 10,000 pounds per square inch, an Izod impact strength of at least 2 ft. lbs. per inch of notch and comprising a cementation of fused synthetic material and fusible synthetic filaments which are fusible under heat and pressure to yield said fused synthetic material, all of the said fusible synthetic filaments having approximately the same fusion point and being molecularly oriented, discontinuous filaments of an acrylonitrile polymer containing an average of at least 80% by weight of combined acrylonitrile, and the said fused synthetic material having the same chemical constitution as the said fusible synthetic filaments.

17. A product as in claim 16 wherein the hard, rigid, heat- and compression-molded article has a flexural strength within the range of from 12,300 to 16,300 pounds per square inch, and an Izod impact strength within the range of from 2.53 to 17.1 ft. lbs. per inch of notch.

18. A product comprising a hard, rigid, heat- and compression-molded article having an Izod impact strength of at least 2 ft. lbs. per inch of notch and comprising a cementation of fused synthetic material and fusible synthetic filaments which are fusible under heat and pressure to yield said fused synthetic material, all of the said fusible synthetic filaments having approximately the same fusion point and being molecularly oriented, discontinuous filaments of an acrylonitrile polymer containing an average of at least 80% by weight of combined acrylonitrile, and the said fused synthetic material having the same chemical constitution as the said fusible synthetic filaments.

References Cited in the file of this patent

UNITED STATES PATENTS

| | | |
|---|---|---|
| 2,336,797 | Maxwell | Dec. 14, 1943 |
| 2,357,392 | Francis | Sept. 5, 1944 |
| 2,459,804 | Francis | Jan. 25, 1949 |
| 2,483,406 | Francis | Oct. 4, 1949 |
| 2,558,730 | Cresswell | July 3, 1951 |
| 2,558,732 | Cresswell | July 3, 1951 |
| 2,558,733 | Cresswell et al. | July 3, 1951 |
| 2,558,735 | Cresswell et al. | July 3, 1951 |
| 2,571,457 | Ladisch | Oct. 16, 1951 |
| 2,666,976 | Olmer et al. | Jan. 26, 1954 |
| 2,676,161 | Cresswell | Apr. 20, 1954 |
| 2,689,199 | Pesce | Sept. 14, 1954 |
| 2,746,839 | Terry et al. | May 22, 1956 |
| 2,891,279 | Newmann | June 23, 1959 |